Patented Oct. 20, 1925.

1,558,440

UNITED STATES PATENT OFFICE.

HARRY M. WEBER, OF MONTCLAIR, NEW JERSEY, ASSIGNOR TO ELLIS-FOSTER COMPANY, OF MONTCLAIR, NEW JERSEY, A CORPORATION OF NEW JERSEY.

PREVENTING THE STICKING OF PLASTIC MATERIALS TO MOLDS.

No Drawing.  Application filed March 22, 1924.  Serial No. 701,231.

*To all whom it may concern:*

Be it known that I, HARRY M. WEBER, a citizen of the United States, and a resident of Montclair, in the county of Essex and State of New Jersey, have invented certain new and useful Improvements in Preventing the Sticking of Plastic Materials to Molds, of which the following is a specification.

This invention is concerned with the prevention of the adhesion to molds of plastic materials used in hot pressing operations. The invention has application in the molding of compositions which are made from a resinous binder incorporated with various types of fillers. Hence the invention embraces molding compositions employing natural resins such as shellac or copal or rosin binders and various synthetic resins such as those prepared from phenol and formaldehyde, phthalic glyceride, urea and formaldehyde and other synthetic resinous products or resinoids appropriate for the purpose. In molding many of these compositions as for example by compressing the powdered molding composition into a hot mold adhesion of the molded article to the mold will occur this being termed by the molder "sticking". It is very troublesome at times and causes unsightly marks or stains on the molded article besides requiring time to dislodge the article from the mold. The trouble seems to be more aggravated in the case of resinous compositions capable of reacting and setting in the mold. It has been the custom in some cases to apply wax or grease to the mold but this oftentimes impairs the surface of the molded specimen.

In the present invention I solve the difficulty by dusting the mold with a finely powdered water insoluble soap, commonly known as metallic soap. There are a great many soaps of this character which could be used for the purpose including the stearates, palmitates and oleates (or mixtures thereof) of aluminum, chromium, zinc, calcium, magnesium, barium and the like.

Illustratively I employ aluminum palmito-stearate as may be obtained by precipitating a soluble salt of aluminum such as alum with the sodium soap of commerical stearic acid which is a mixture of stearic and palmitic acids. If the dusting powder is to be used with dark colored material such as the black products commonly made for electrical insulating purposes from synthetic resin molding compositions I may add a small amount of a dye which carried down with the precipitate colors it to the desired color preferably matching the color of the molding composition in each case. The precipitate is washed and dried and if not finely divided by precipitation it may be noted such water insoluble soaps tend to precipitate in a somewhat coagulated form. I grind the material carefully preferably to pass a 100 mesh screen. It is generally important to grind or pulverize the material in this way for two reasons. In the first place the dusting powder is more economical to use because it covers a greater surface for a given weight and in the second place coarse particles of the material embedded in the surface of the molded specimen would be unsightly and would cause it to be rejected. I have found however that by grinding the material to a fineness which will permit it to pass the screen of 100 mesh that the surface of the molded article does not appear to have its smoothness or lustre impaired by the dusting of the powder in the mold.

In using the material it is simply distributed or dusted lightly in the mold, the molding composition then introduced and the pressing made.

The foregoing illustration setting forth the aluminum palmito-stearate is only one of such metallic soaps or mixtures containing them which can be prepared or used in accordance with the present invention.

The foregoing illustration setting forth the position to prevent sticking to molds consisting of or containing a metallic soap such as aluminum palmitate or zinc stearate of a fineness such that it will pass a 100 mesh screen or of such a degree of comminution that it does not affect the surface of the molded article, such dusting composition preferably being light in color for molding compositions which are of a light color and correspondingly dark in color for molding compositions of a darker shade.

What I claim is:—

1. In molding plastic resinous substances having a tendency to stick to the mold the step which consists in dusting the mold prior to molding with a dusting powder comprising a metallic soap.

2. In molding plastic resinous substances having a tendency to stick to the mold the step which consists in applying to the surface of the mold, prior to molding, a powder comprising a water-insoluble soap in a state of fineness sufficient to pass a 100 mesh screen and free from particles militating against the surface finish of the molded article.

3. In molding plastic resinous substances having a tendency to stick to the mold the step which consists in applying to the surface of the mold, prior to molding, a powder comprising a water-insoluble soap substantially free from particles militating against the surface finish of the molded article.

HARRY M. WEBER.